(12) United States Patent
Kwon et al.

(10) Patent No.: US 9,781,741 B2
(45) Date of Patent: Oct. 3, 2017

(54) DEVICE AND METHOD FOR CONTROLLING SLOT-BASED CHANNEL ACCESS IN WIRELESS LAN SYSTEM, AND SLOT-BASED CHANNEL ACCESS TERMINAL IN WIRELESS LAN

(71) Applicant: Electronics and Telecommunications Research Institute, Daejeon (KR)

(72) Inventors: Hyoung Jin Kwon, Daejeon (KR); Jae Seung Lee, Daejeon (KR); Min Ho Cheong, Daejeon (KR); Hee Jung Yu, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/409,456

(22) PCT Filed: Jun. 19, 2013

(86) PCT No.: PCT/KR2013/005414
§ 371 (c)(1),
(2) Date: Dec. 18, 2014

(87) PCT Pub. No.: WO2013/191470
PCT Pub. Date: Dec. 27, 2013

(65) Prior Publication Data
US 2015/0327262 A1 Nov. 12, 2015

(30) Foreign Application Priority Data

Jun. 19, 2012 (KR) .................. 10-2012-0065519
Jul. 11, 2012 (KR) .................. 10-2012-0075397
(Continued)

(51) Int. Cl.
*H04B 7/00* (2006.01)
*H04W 72/12* (2009.01)
(Continued)

(52) U.S. Cl.
CPC ..... *H04W 72/1289* (2013.01); *H04W 72/0446* (2013.01); *H04W 74/04* (2013.01); *H04W 84/12* (2013.01)

(58) Field of Classification Search
CPC .. H04W 76/02; H04W 76/021; H04W 76/025
(Continued)

(56) References Cited

U.S. PATENT DOCUMENTS

| 8,824,440 | B2* | 9/2014 | Ghosh | H04W 28/14 370/338 |
| 9,137,823 | B1* | 9/2015 | Liu | H04W 74/006 |
| 9,204,371 | B2* | 12/2015 | Liu | H04W 48/12 |
| 2013/0229959 | A1* | 9/2013 | Ghosh | H04W 74/08 370/311 |
| 2015/0029977 | A1* | 1/2015 | Seok | H04W 76/023 370/329 |

(Continued)

FOREIGN PATENT DOCUMENTS

| CN | 1578242 A | 2/2005 |
| CN | 1906893 A | 1/2007 |

(Continued)

OTHER PUBLICATIONS

Chittabrata Ghosh et al., "Group Synchronized DCF," IEEE 802.11-12/0329r1, Mar. 2012, pp. 1-13.
(Continued)

*Primary Examiner* — Dmitry H Levitan

(57) ABSTRACT

An apparatus and a method of controlling slot-based channel access by an access point (AP) to manage a network in a wireless local area network (WLAN) environment and a slot-based channel access terminal are disclosed. A slot-based channel access control apparatus of a WLAN system according to an exemplary embodiment determines one of each terminal and a group of terminals as a slot allocation target, allocates a slot defined in a beacon interval to the determined terminal or group to distinguish channel access time, and transmits a beacon including information on the allocated slot.

14 Claims, 9 Drawing Sheets

(30) Foreign Application Priority Data

Jan. 22, 2013 (KR) .......................... 10-2013-0007172
May 2, 2013 (KR) .......................... 10-2013-0049514
Jun. 19, 2013 (KR) .......................... 10-2013-0070170

(51) Int. Cl.
*H04W 72/04* (2009.01)
*H04W 84/12* (2009.01)
*H04W 74/04* (2009.01)

(58) Field of Classification Search
USPC .................... 370/310, 311, 328, 329, 346
See application file for complete search history.

(56) References Cited

U.S. PATENT DOCUMENTS

2015/0057008 A1* 2/2015 Seok .................... H04L 5/0092
455/452.1

FOREIGN PATENT DOCUMENTS

| CN | 101589577 A | 11/2009 |
|----|----|----|
| EP | 2 330 778 A2 | 6/2011 |
| KR | 10-2008-0021753 A | 3/2008 |
| KR | 10-2011-0130273 A | 12/2011 |
| WO | WO 2009/099966 A2 | 8/2009 |

OTHER PUBLICATIONS

Minyoung Park et al., "Uplink Channel Access," IEEE 802.11-12/0606r0, May 14, 2012, pp. 1-20.
International Search Report for PCT/KR2013/005414, mailed Sep. 27, 2013.

* cited by examiner

DEVICE AND METHOD FOR CONTROLLING SLOT-BASED CHANNEL ACCESS IN WIRELESS LAN SYSTEM, AND SLOT-BASED CHANNEL ACCESS TERMINAL IN WIRELESS LAN

TECHNICAL FIELD

The present invention relates to an apparatus and a method of controlling slot-based channel access by an access point (AP) for managing a network in a wireless local area network (WLAN) environment and a slot-based channel access terminal operating based on the method.

BACKGROUND ART

When too many terminals, for example, stations (STAs) are present in a wireless local area network (WLAN), a probability that the STAs collide with each other increases. When an STA that performs channel access without listening to a beacon or an STA of an overlapping basic service set (BSS) or neighboring BSS conducts channel access, the STAs may compete with an STA allocated a slot through a beacon.

Thus, the STA performs channel access in a distributed coordination function (DCF) mode even in the allocated slot. However, when there are relatively more STAs the which slots are not allocated than STAs to which slots are allocated in the DCF, a great number of STAs perform channel access for a short period of time, thus increasing a delay in channel access.

For example, when an STA corresponding to a bit set to "1" in a traffic indication map (TIM) performs channel access to receive buffered data, a delay may occur. Further, in the presence of a hidden node in an uplink, a collision probability increases.

Also, it is important for a terminal or sensor considering power saving to reduce time to detect a channel by decreasing collisions.

A slot size is determined in advance before a beacon is transmitted. Here, an STA may transmit all data using only a portion of a slot. When another STA uses a remaining period of the slot or unused slot period, network resources may be efficiently used.

DISCLOSURE OF INVENTION

Technical Goals

An aspect of the present invention provides a method of allocating a slot to a terminal, for example, a station (STA), by an access point (AP) in a wireless local area network (WLAN). Further, an aspect of the present invention is to provide a method of releasing an allocated slot when the slot is not used by the STA or includes a remaining time after use so that another STA may use an unused slot or an unused period of the slot.

Further, another aspect of the present invention provides a method of allocating a slot for channel access, based on a priority to an STA that needs to save power or to transmit urgent data, so that the STA is less likely to collide and quickly transmits data.

Technical Solutions

According to an aspect of the present invention, there is provided a slot-based channel access control apparatus in a wireless local area network (WLAN) system according to an exemplary embodiment including a controller to determine one of each terminal and a group of terminals as a slot allocation target, an allocation unit to allocate a slot defined in a beacon interval to the determined terminal or group to distinguish channel access time, and a transmission unit to transmit a beacon comprising information on the allocated slot.

The information on the allocated slot may include allocation control information, an association identification (AID), a start slot ID and allocation duration information.

The information on the allocated slot may include an AID and a start slot ID when the slot is allocated to each terminal and resources are successively allocated to each terminal.

The information on the allocated slot may include a start slot ID according to order of being set to "1" bit in a traffic indication map (TIM) when resources are allocated only to terminals set to "1" bit in the TIM.

The terminals may include a TIM station (STA) that checks the beacon and verifies buffered downlink data or a non-TIM STA that does not verify the beacon or buffered downlink data of a TIM broadcast frame.

The TIM STA may be a scheduled beacon checking STA that listens to the beacon and conducts channel access in the allocated slot.

The non-TIM STA may be one of a scheduled active polling STA which is allocated the slot in response to a request of the terminal and conducts channel access in the allocated slot, an unscheduled active polling STA conducting channel access without resource allocation, and a terminal for saving power by setting up null data packet (NDP) paging.

According to an exemplary embodiment, the apparatus may further include a reception unit to receive, from the non-TIM terminal, whether to support a target wake time (TWT) function allocated as wakeup time of the non-TIM terminal through an association request frame, wherein the allocation unit may allocate an AID of a TWT STA supporting the TWT function to a non-TIM STA group supporting the TWT function.

According to an exemplary embodiment, the apparatus may further include a setup unit to set up a period comprising an entire TWT period to be allocated as restricted access window (RAW) when the beacon interval comprises a TWT to be allocated by the allocation unit, wherein the transmission unit may transmit RAW related information to be included in the beacon.

The RAW related information may be defined as an RAW parameter set information element (RPS IE), and the RPS IE may include RAW group information, RAW start time information, RAW duration information and slot information.

The RAW group information may include a page ID, a block offset and a block range.

The TIM STA receiving the beacon including the RAW related information may not conduct channel access in the RAW.

When the RPS IE includes an indicator showing that the RAW is allocated to the non-TIM STA, the RAW group information and slot information may be omitted.

The allocation unit may allocate a TWT identified as a flow identifier to each flow when each terminal may include a plurality of flows with different traffic properties, and allocate a plurality of AIDs to each terminal.

When the RPS IE includes an indicator showing that the RAW is allocated to the non-TIM STA and the RAW group information is omitted, the TIM STA listening to the RPS IE may not access a channel set in a channel (CH) indication field during a time of RAW duration from RAW start time.

When the allocated TWT is included during the time of the RAW duration from the RAW start time, a TWT STA listening to the RPS IE may conduct channel access at the allocated TWT.

According to an exemplary embodiment, the apparatus may further include a scheduling unit to schedule an RAW for the unscheduled active polling STA in advance, wherein when the reception unit receives a PS-poll frame from the unscheduled active polling STA, the transmission unit may transmit RAW related information scheduled in advance to the unscheduled active polling STA.

The RAW related information may be defined as an RPS IE, and the RPS IE may include RAW group information, RAW start time information, RAW duration information, an indicator showing that the RAW is allocated to the non-TIM STA and an indicator showing that the RAW is allocated to the unscheduled active polling STA.

When a plurality of PAWs includes an overlapping period, the setup unit may set up a network allocation vector (NAV) or access priority by RAW group so that the terminals or group does not conduct channel access in the overlapping period.

The allocation unit may periodically allocate resources for the non-TIM STA set to be a RAW, as a periodic RAW (PRAW), to the terminals or group, and the transmission unit may transmit a beacon including information on the allocated PRAW.

The information on the PRAW may be defined as an RPS IE, and the RPS IE may include an indicator showing that the allocated RAW is the PRAW, a PRAW period and PRAW start time information.

The transmission unit may transmit the RPS IE to be included in a long beacon.

The PRAW start time information may include relative PRAW start time calculated using an offset that is a number of beacon intervals in which a first PRAW appears from the long beacon.

The PRAW start time information may include absolute PRAW start time calculated using a timing synchronization function (TSF).

The allocation unit may allocate the slot to the terminals or group associated with a relay STA from the relay STA using a PRAW, and the transmission unit may transmit a beacon including information on the allocated PRAW.

The information on the allocated PRAW may include an indicator showing that the PRAW is allocated to a single terminal and an AID of the single terminal.

The allocation unit may allocate different start times of first PRAWs allocated to a plurality of relay STAs, so that resources are allocated to different relay STAs through time sharing.

According to an exemplary embodiment, the apparatus may further include a detection unit to detect a channel for data sensing time set in the allocated slot, and a determination unit to determine that the allocated slot is in an idle state when the channel is not detected for the data sensing time.

The transmission unit may transmit information indicating that the allocated slot is in the idle state to a terminal to which the slot is not allocated.

The transmission unit may transmit information indicating that the allocated slot is in the idle state, being included in a clear to send to self (CTS-to-self) frame in an NDP form, to a terminal to which the slot is not allocated.

According to an aspect of the present invention, there is provided a slot-based channel access terminal in a WLAN system including a reception unit to receive a beacon comprising information on an allocated slot from an access point (AP), and a channel access unit to conduct channel access in the slot based on the information on the allocated slot.

The reception unit may receive information on an RAW comprising successively allocated slots from the AP, and the channel access unit may conduct channel access in the slot based on RAW group information, RAW start time information, RAW duration information and slot information comprised in the information on the RAW.

According to an exemplary embodiment, the terminal may further include a controller to set an NAV of transmission opportunity (TxOP) in the slot based on data capacity.

A slot-based channel access control method in a WLAN system according to an exemplary embodiment includes determining one of each terminal and a group of terminals as a slot allocation target, allocating a slot defined in a beacon interval to the determined terminal or group to distinguish channel access time, and transmitting a beacon comprising information on the allocated slot.

Effects of Invention

The present invention provides a method of allocating a slot to a terminal, for example, a station (STA), by an access point (AP) using a restricted access window (RAW) or periodic RAW (PRAW) in a wireless local area network (WLAN), thereby reducing a delay in channel access of the STA allocated the slot. Further, power consumption of the STA may decrease due to a reduced delay.

Further, the present invention provides a method of releasing an allocated slot when the slot is not used by the STA or includes a remaining time after use so that another STA may use an unused slot or a remaining portion of the slot, thereby improving efficient use of network resources.

The present invention provides a method of allocating a slot for channel access, based on a priority to an STA that needs to save power or to transmit urgent data, so that the STA is less likely to collide to increase data transmission rate.

BEST MODE FOR CARRYING OUT THE INVENTION

Figure 1:
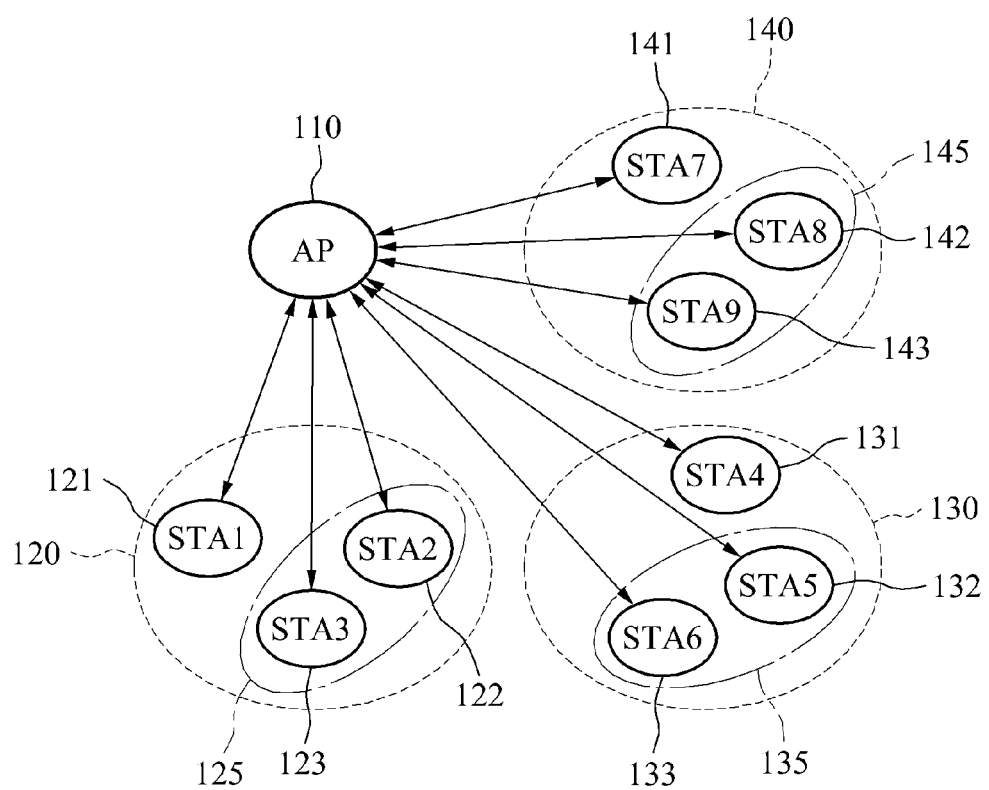
FIG. 1 illustrates a wireless local area network (WLAN) environment which includes an access point (AP) and a plurality of terminals according to an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Hereinafter, exemplary embodiments of the present invention will be described in detail with reference to the accompanying drawings.

FIG. 1 illustrates a wireless local area network (WLAN) environment which includes an access point (AP) and a plurality of terminals according to an exemplary embodiment of the present invention.

A power saving mode (PSM) method is defined in a WLAN to reduce power consumption of the terminals, for example, STA1, STA2, STA3, STA4, STA5, STA6, STA7, STA8 and STA9. The AP 110 periodically transmits a beacon and transmits existence of a buffered frame to STA1, STA2, STA3, STA4, STA5, STA6, STA7, STA8 and STA9 through a Traffic indication map (TIM) field of the beacon. In the following description, STA1, STA2, STA3, STA4, STA5, STA6, STA7, STA8 and STA9 will be collectively referred to as an STA.

The STA in a sleep mode periodically wakes up to receive a TIM of the beacon transmitted by the AP 110. When a bit value of the STA in the TIM is "0", the STA goes back to sleep. When the bit value is "1", the STA may need to wake up until a last frame scheduled for transmission in a current beacon interval is transmitted. The STA may check a more data field of a frame header transmitted by the AP 110 to identify a last frame. In particular, a more data field of "0" indicates a last frame, which means there is no more frame to be transmitted, and thus the STA may operate in the sleep mode after receiving the last frame.

However, power consumption of the STA in the PSM is determined based on not only traffic to be transmitted to the STA but also traffic to other STAs, since an interruption may occur during data transmission between the AP 110 and the STA in an attempt to transmit data between the AP 110 and another STA. When an interruption occurs, it takes a longer time for the STA to receive all buffered frames, thus increasing power consumption of the STA. In this instance, as power consumption rises with a larger number of STAs, a sensor STA considering operation with low power needs power saving solutions.

One of the solutions is reducing a number of STAs simultaneously conducting channel access by allowing the STAs to conduct channel access at different times. Here, to assign the access times, the AP 110 may divide a beacon interval or a smaller window interval into time units, for example, slots, and allocate the slots to the STAs. This method may be referred to as slot-based channel access in the present invention.

A slot allocated to each STA may be identified through a location of the STA on a TIM bitmap. The STA verifies a TIM, calculates the location of the STA, and conducts channel access from a start point of a corresponding slot. The STA may conduct a channel access operation in each slot based on time division multiple access (TDMA) or carrier sense multiple access/collision avoidance (CSMA/CA).

In TDMA where a slot resource is allocated only to a predetermined STA, the predetermined STA uses the slot resource and thus may immediately conduct channel access from a beginning of the slot without clear channel assessment (CCA). In CSMA/CA, since an STA that does not listen to a beacon in an overlapping basic service set (OBSS) or BSS, for example, a non-TIM STA, may conduct channel access, an STA performs CCA even on a slot of the STA, and then uses CSMA/CA of a WLAN to access when it is verified that the slot of the STA is not in use.

Assuming that a slot is allocated for all STAs belonging to a TIM or a slot is allocated for each group of divided STAs, slot duration may be fixed for all STAs or each group. However, since the AP 110 may buffer different sizes of data for STAs and use different channels for the STAs, it takes different periods of time to transmit data to the respective STAs. Thus, a different number of slots may be needed for each STA.

The AP 110 may allocate a slot to each STA or a group of STAs and allocate a restricted access window (RAW) or periodic RAW including the slot.

The AP 110 may transmit a TIM indicating existence of buffered data to STA1, STA2, STA3, STA4, STA5, STA6, STA7, STA8 and STA9 by group.

In an infrastructure mode of the WLAN, the AP 110 may buffer a frame for STA1, STA2, STA3, STA4, STA5, STA6, STA7, STA8 and STA9 that are sleeping in the PSM.

The AP 110 may receive information on service properties or traffic properties of each STA from STA1, STA2, STA3, STA4, STA5, STA6, STA7, STA8 and STA9.

The information on the traffic properties may be information on Traffic Class (TCLAS) information used in Institute of Electrical and Electronics Engineers (IEEE) 802.11e standards, while the information on the service properties may be information on an access category (AC) of enhanced distributed channel access (EDCA). Alternatively, the information on the service properties or traffic properties may be defined newly, based on applications.

The AP 110 may group terminals having similar service properties or traffic properties. The AP 110 may STA1 121, STA2 122 and STA3 123 having similar service properties or traffic properties into one group 120. Also, the AP 110 may STA4 131, STA5 132 and STA6 133 having similar service properties or traffic properties into one group 130. Further, The AP 110 may STA7 141, STA8 142 and STA9 143 having similar service properties or traffic properties into one single group 140.

The AP 110 may broadcast information on target wake time (TWT) having different values to the groups 120, 130 and 140 so that the STAs in the group 120, 130 and 140 wake up at different times to conduct channel access. The STAs in each group may acquire the information on the TWT, wake up based on the information, and conduct channel access.

Moreover, when a number of STAs included in the group 120 is greater than a preset level, the AP 110 may generate a subgroup 125 to meet the preset level. The preset level may be determined based on a kind, a number and a status of channels supported by the AP 110. Also, the preset level may be defined in various manners, based on specific service properties or traffic properties.

For instance, when the preset level is two, the subgroup 125 may include STA2 122 and STA3 123. Alternatively, the subgroup 125 may include STA1 121 and STA2 122, or STA1 121 and STA3 123. Likewise, when a number of STAs included in other groups 130 and 150 is greater than a preset level, subgroups 135 and 145 may be generated so as to meet the preset level. The subgroup 135 may include STA5 132 and STAG 133. The subgroup 145 may include STA8 142 and STA9 143.

Alternatively, when one group 120 includes a plurality of subgroups 125, the same TWT setting but different offset values may be provided for the subgroups. Thus, STAs in different subgroups of the same group may wake up at different times to conduct channel access. Consequently, STAs become less likely to collide in channel access, resulting in a decrease in power consumption of the STAs.

Figure 2:
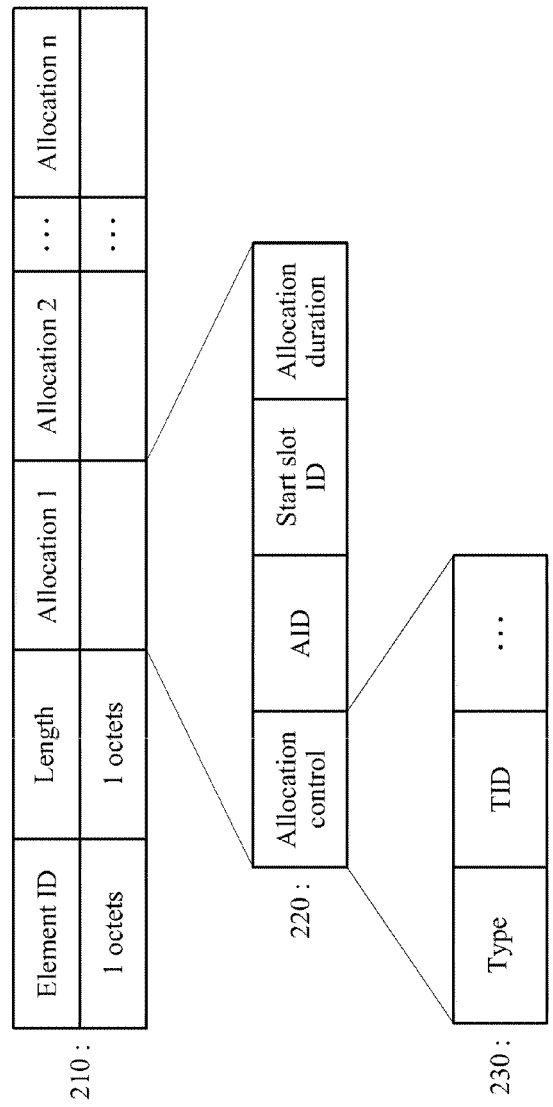
FIG. 2 illustrates a slot allocation frame used for a slot-based channel access control apparatus of a WLAN system according to an exemplary embodiment.

FIG. 2 illustrates a slot allocation frame used by a slot-based channel access control apparatus of a WLAN system according to an exemplary embodiment of the present invention.

The present invention may provide methods of the AP transmitting information on a number of slots needed for each STA and information on the slots to the STA.

A first method uses a slot allocation frame 210. Information on successive slots allocated to the STA may be reflected in the frame. An element ID is an identifier (ID) to identify the slot allocation frame 210, and a length field indicates a number of allocation fields 220.

An allocation field 220 may include an allocation control field 230, an association ID (AID) field, a start slot ID field and an allocation duration field. The allocation control field 230 is used to indicate properties of allocation and may include a type and a traffic identifier (TID).

The type is used to indicate whether a slot is allocated to a predetermined STA or group. The group may be, for example, a multi-user multiple-input multiple-output (MU-MIMO) group. When the type is set to "0", which means that the slot is allocated to the predetermined STA, an AID of the STA is set in the AID field. When the type is set to "1", which means that the slot is allocated to the group, a group ID of a corresponding group STA is set in the AID field. For example, 6 bits may be allocated to the group ID. The TID represents a traffic stream (TS) or traffic category (TC).

The AID field illustrates an ID of the allocated STA. The AID field may represent a group ID or partial AID.

The start slot ID, also referred to as a start slot offset or slot start offset, indicates an ID of an allocation start slot.

The allocation duration represents a size of an interval in which slots are allocated and is in a unit of slot.

In a second method, assuming that slot resources are allocated to a predetermined STA, being allocated successively instead of separately from each other, a time of a start slot of each resource is only used. Here, duration may be calculated as a period prior to a start slot ID of a subsequent allocated resource. In this case, the allocation field 220 may include the AID field and the start slot ID only.

In a third method, resources are allocated only to an STA with a TIM set to "1" bit, in which case the allocation field 220 may include only a start slot ID allocated in order of being set to "1" bit in a TIM bitmap, omitting the AID. Similarly to the second method, slots from a start slot ID to prior to a subsequent start slot ID may be calculated as a slot allocated to the STA. The slot allocation field 210 including information on an allocated slot may be transmitted to the STA or group STA, being included in a beacon as an information element (IE) or configured as a separate frame.

A slot may be allocated for transmission of not only downlink (DL) data but also uplink (UL) data.

However, the AP may allocate a slot to an STA that does not listen to the beacon and is not included in the TIM, for example, a non-TIM STA.

STAs may be classified into the following types.

A first type is a scheduled beacon checking STA that listens to a beacon and conducts channel access in a time period allowed by the AP for the STA or a group that the STA belongs to.

A second type is a scheduled active polling STA that is allocated a time period for channel access from the AP upon a request of the STA and conducts channel access in the allocated time period. The scheduled active polling STA may be also referred to as a TWT STA since the STA sets a TWT in advance with the AP and wakes up at the scheduled TWT to conduct channel access.

A third type is an unscheduled active polling STA that always conducts channel access to transmit UL data without resource allocation.

A fourth type is a null data packet (NDP) paging setup STA that sets up NDP paging when setting a TWT, and saves power of the STA, using an existence of buffered DL data and efficient signaling for synchronization as an NDP paging frame of an NDP type.

Among the four types of STAs, the first STA corresponds to a TIM STA that checks a beacon and verifies buffered DL data. The second and third STAs perform active polling without checking a beacon. The fourth STA does not listen to a beacon since the STA receives a paging frame optimized for the STA, instead of checking the beacon broadcasted to all STAs or buffered data as a TIM element in a TIM broadcast frame. Thus, the other three types of STAs may be non-TIM STAs.

Since an operation of listening to a beacon to verify a TIM consumes power of an STA, the non-TIM STAs wake up without listening to the beacon, sense a channel, and then immediately transmit UL data to the AP or transmit a PS-poll frame or trigger frame to the AP to identify DL data if there is no UL data.

In order to decrease power consumption while reducing competition with other STAs, the AP may allocate and report information on time to send data, for example, target wake time as time to wake up and an interval indicating a time period allocated after wakeup, to a predetermined non-TIM STA after the non-TIM STA wakes up.

Further, the AP may report the information on the time allocated to the non-TIM STA to other STAs listening to the beacon so as to restrict channel access by the other STAs in the time allocated to the non-TIM STA, thereby reducing competition with STAs accessing the AP around the same time and thus decreasing power consumption of the non-TIM STA.

Among the non-TIM STAs, an STA supporting a TWT function may set a field representing support for the TWT function to a value indicating that support for the TWT function is possible and transmit the field value to the AP when making an association request to the AP.

When the AP is able to provide a TWT to a corresponding STA, the AP may report the TWT to the STA and allocate an AID of the STA to be included in the non-TIM STA supporting the TWT function. Allocation of the TWT may be achieved through exchange of management action frames between the AP and the STA after association. When the AID of the STA allocated the TWT does not belong to the non-TIM STA group supporting the TWT after allocation of the TWT, the AP may reassign the AID of the STA to be included in the non-TIM STA group.

The AP may set a time period including an entire period of the allocated TWT as a RAW and transmit RAW related information to be included in the beacon to the STAs.

The AP may include time information allocated to the non-TIM STAs in the beacon and transmit in a TIM form. When successive times are allocated to the non-TIM STAs, the AP may group the non-TIM STAs and transmit a UL TIM indicating that there is an allocated time for UL to each non-TIM STA.

Further, in an UL, each STA may be allocated different times or a plurality of slots may be used, and thus the RAW may be used. In this instance, an STA listening to a general TIM belongs to a different group from that of the non-TIM STAs, and thus does not access a time period allocated to the non-TIM STAs.

When times allocated to the non-TIM STAs are not successive or time allocated to a non-TIM STA is short, allocation of the slot to a group may be inefficient. Further, since slot allocation for the non-TIM STA is realized with respect to a fast time period due to a low duty cycle of the STAs and slot allocation for an STA group listening to the TIM is achieved before the beacon is transmitted, it may be necessary to maintain time for the non-TIM STA allocated in advance.

Here, the AP may allocate overlapping time. Here, when the AP allocates time overlapping with time allocated for a non-TIM STA to a group, the AP may report whether the times overlap and overlapping time.

The AP converts time information allocated to the non-TIM STA into a slot unit that is a time unit allocated to a group STA. Then, the AP may report information on an allocated slot using the aforementioned slot-based allocation method. Here, the AID of the non-TIM STA has a different range from that of the AID of the group STA and thus may not be indicated in the TIM or slot allocation map. However, since the non-TIM STA operates without listening to the TIM, the AP reports the information on the slot allocated to the non-TIM STA to another STA listening to the TIM so that the other STA does not access the AP. The AP may reserve a predetermined AID for reporting the information on the allocated slot. Alternatively, as the allocated slot is reserved, the AP may gather unavailable slots and report information on the unavailable slots through a separate indicator.

While the non-TIM STA conducts channel access to the AP, a resource for the non-TIM STA set through the RAW tends to be periodically allocated so as to prevent channel access by another STA. A periodic RAW (PRAW) may be defined for the periodically allocated resource.

An RAW parameter set information element (RPS IE) may include an indication field showing that the RAW is the PRAW and a field indicating a period in which one RAW is repeated. The AP transmits information on the PRAW being included only in a predetermined beacon, for example, a long beacon, thereby reducing overhead of the RPS IE indicating a repeated PRAW. Particularly, a size of a short beacon may be reduced.

The RPS IE may indicate time at which the RAW starts through a RAW start time field. The RAW start time may be calculated as a time unit (TU) value after transmission of the beacon ends.

A PRAW start time may be calculated directly from the long beacon in a TU or may be also calculated relatively using an offset. The offset may be determined as a number of beacon intervals in which a first PRAW appears from the long beacon including the RPS IE having PRAW related information.

The RAW start time indicates time from a target beacon transmission time of a short beacon in which a PRAW appears first. Thus, time at which the first PRAW appears from the long bacon may be calculated by offset*beacon interval+RAW start time.

A position of the PRAW after the first PRAW may be calculated by offset*beacon interval+RAW start time+(i−1) *period of PRAW, defining an index of an $i^{th}$ PRAW as i. The period may be in a TU.

The STA listening to the RPS IE including the PRAW related information may determine whether the PRAW is located in the beacon interval from the short beacon to access. When a number of beacon intervals (BIs) to the short beacon to access is j, $$j*BI<\text{offset}*BI+\text{RAW start time}+(i-1)*\text{period}<(j+1)*BI$$

$$0<=i<\text{integer(long beacon period/PRAW period)}.$$

When there is an i satisfying the above two inequations, the STA listening to the RPS IE including the PRAW related information does not conduct channel access for an $i^{th}$ PRAW interval with respect to every i.

However, the TBTT at which the beacon is sent may be delayed when a medium is occupied in advance. Particularly, in a large offset, a plurality of beacons are transmitted, and thus the TBTT may be likely to be substantially delayed. In this case, the RAW start time calculated from an end of a beacon also changes. However, since the TWT allocated for the non-TIM STA is predetermined and the non-TIM STA does not listen to the beacon, the non-TIM STA does not recognize the delay in the TBTT. Thus, the RAW start time may need to be expressed as an absolute time, instead of a relative time. For example, the time at which the first PRAW appears from the long beacon may not be expressed as a relative value from the TBTT but use a timing synchronization function (TSF) as an absolute time.

As compared with use of a relative time, using an absolute time involves an increase in a number of bits of the RPS IE but enables an STA listening to only a long beacon without listening to a short beacon to recognize an accurate PRAW start time even though a TBTT of a subsequent short beacon is different from an expected value.

When a relative time is used, the RAW start time is corrected by a difference between an expected TBTT value and an actual time at which the short beacon is received.

Next, a method of reusing an allocated slot will be described. When the AP allocates a slot indicating an access time to an STA, the allocated slot may not be used by the STA or include a remaining part after the STA uses the allocated slots for transmitting data traffic. Thus, the AP may allow another STA to use the remaining slot for efficient use of resources in the network.

To reuse the allocated slot, the STA may need to conduct channel access from a start of the allocated slot. A data sensing time parameter may be added. The AP may sense a channel to determine whether the STA transmits data in the allocated slot during a data sensing time. When the channel is not sensed during this time, the AP may determine that the slot allocated to the STA is in an idle state.

Even though two or more STAs simultaneously access a channel to cause a collision, the AP is able to sense occurrence of collisions and thus to determine that the channel is busy.

When the allocated slot is determined to be in the idle state, the AP reports the slot or channel to another STA. A reporting frame is a form of NDP. The NDP may be, for example, a frame that performs the same function as the CTS-to-self frame but includes only a preamble.

A CTS ID field may be set as a preamble in a signal (SIG) field. A medial access control (MAC) address or BSSID to identify the AP may be set in the CTS ID. Further, the CIS ID may include a partial address due to limitation on bits of the SIG field. Further, when two or more bandwidths are bonded for use, a duplication mode may be used in which an entire bandwidth is divided into unit bandwidths and the same frame is transmitted in each unit bandwidth. For instance, in 1-MHz duplication, the AP transmits an NDP CTS-to-self frame in a 1-megahertz (MHz) unit in a released channel bandwidth.

An STA performs a channel access operation in a slot as follows. The STA may conduct channel access in an allocated slot according to a predetermined channel access mode, for example, TDMA or CSMA/CA.

The STA may conduct channel access from a start point of the slot, and an STA that is not allocated a slot but wishes to use a channel may wait for an NDP CTS-to-self frame to be transmitted from the AP. When the NDP CTS-to-self frame is not received and the channel is in a busy state, the channel is considered to be used by the allocated STA. However, when the NDP CTS-to-self frame is received, which means that the channel is released, the STA accesses the channel according to CSMA/CA and attempts to transmit a frame to the AP.

To reduce collisions with hidden nodes, the STA may transmit data after exchange of RTS-CTS frames. Subsequently, the STA may transmit a PS-poll frame or trigger frame, for example, to retrieve DL data. Also, the STA may acquire transmission opportunity (TxOP) to transmit UL data and transmit the UL data in TxOP. With a TxOP limit going beyond the allocated slot to a remaining slot, when a subsequent slot is allocated to the same STA as that a current slot is allocated to, the STA may set TxOP beyond the current slot. However, when the next slot is allocated to another STA, the STA may set TxOP to a current slot interval only.

In the NDP frame indicating that the slot or channel is released so that another STA may use the allocated slot, the NDP CTS-to-self frame is provided for illustrative purposes only, without limiting the NDP frame thereto. The NDP frame may be defined newly for the same purpose. Here, an indication of a new NDP frame may be set to a reserved bit in the SIG field.

When the STA allocated the slot wishes to release the using channel as there is no more data, a channel release indication method is needed. Implicit and explicit methods may be used to indicate that there is no more data to send.

An implicit method uses a more data field of a frame header. When a DL is in use and the STA transmits a more data field of an acknowledgement (ACK) field set to 0, the AP determines that there is no more data that the STA is to send. Another implicit method sets a network allocation vector (NAV) of TxOP considering a data transmission end when an UL is in use and the STA is allowed to set TxOP. The AP may set up a rule such that when the STA does not set TxOP until an end of the slot even with a slot interval remaining, the AP determines that the STA returns the allocated slot since there is no more data to transmit.

In an explicit method, the STA explicitly notifies the AP that use of the slot terminates by transmitting a contention free (CF)-end frame or newly defined frame for truncation of TxOP in enhanced distributed channel access (EDCA).

When the STA returns the allocated slot according to either of the implicit and explicit methods, the AP transmits, for example, an NDP CTS-to-self frame to notify another STA that the allocated slot is released.

Figure 3:
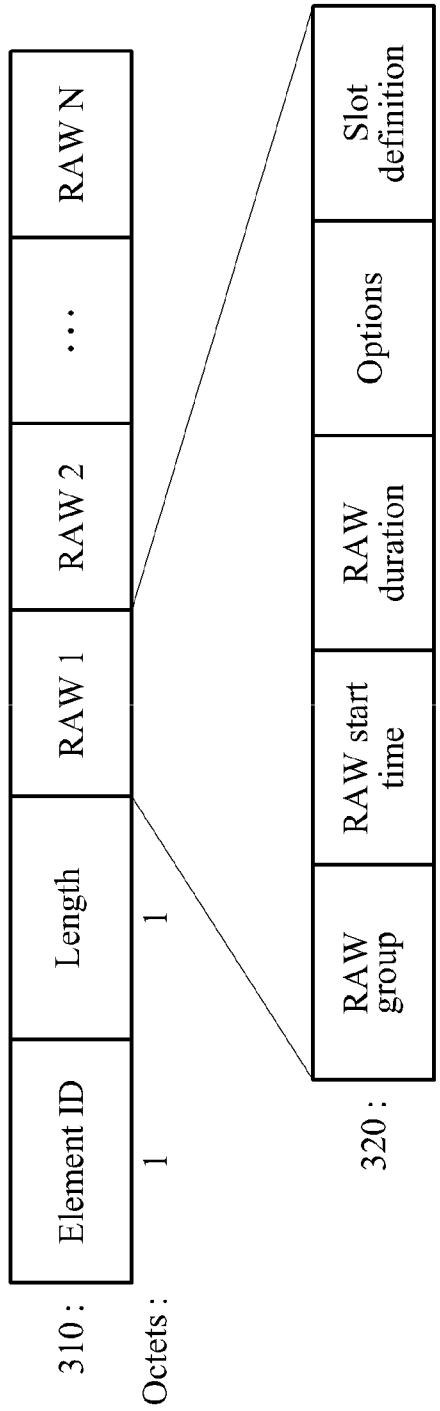
FIG. 3 illustrates a restricted access window (RAW) parameter set information element (RPS IE) used by the slot-based channel access control apparatus of the WLAN system according to an exemplary embodiment of the present invention.

FIG. 3 illustrates an RPS IE used by the slot-based channel access control apparatus of the WLAN system according to an exemplary embodiment of the present invention.

An RAW frame 310 may include an RPS IE 320. An element ID is an ID to identify the RAW frame 310, and a length field indicates a number of RPS IEs 320. An RAW related information is defined in the RPS IE 320. The RPS IE 320 is included in a beacon and may include a plurality of RAW information.

The RPS IE 320 may include an RAW group field, an RAW start time field, an RAW duration field, an option field and a slot definition field. Each field indicates as follows.

RAW Group

| Feature | Value | Interpretation |
|---|---|---|
| Page ID | 2 bits | Indicates the page index for hierarchical AID (based on hierarchical AID) of the allocated group |
| Block Offset | 5 bits | Assuming 32 blocks per page, these bits indicate the starting block index of the allocated group |
| Block Range | 5 bits | Indicates the number of blocks (starting from the block offset) for the allocated group |

| Feature | Value | Interpretation |
|---|---|---|
| RAW Start Time | 8 bits | Duration in TU from end of beacon transmission to RAW Start time |
| RAW Duration | TBD | Duration of RAW in TU |

Option Field and Slot Definition Field

| Feature | Value | Interpretation |
|---|---|---|
| Access restricted to paged STA only | 2 bits | Bit 1: Set to 1 if only STA with their TIM bit set to 1 are allowed to perform UL transmissions<br>Bit 2: Set to 1 if RAW is reserved for frames with duration smaller than slot duration, such as PS-Polls/trigger frames |
| Group/Resource allocation frame | 1 bits | Set to 1 if STAs need to wake up at the beginning of the RAW to receive group addressed frames such as resource allocation (format of the resource allocation frame TBD) |
| Slot definition | TBD | Include<br>Slot duration signaling<br>Slot assignment to STA<br>Cross boundary transmissions allowed/not allowed<br>Format is TBD |

The RAW group field indicates an AID of an RAW, and accordingly an STA listening to the beacon including the RPS IE 320 may verify an RAW to which the STA belongs. The STA may conduct channel access in the RAW based on start time of the RAW, duration of the RAW and slot information. Further, an RAW that the STA does not belong to is for another group to conduct channel access, channel access in the RAW is basically restricted.

When wake time of an STA allocated a TWT is determined by the allocated TWT, the STA operates without checking the beacon and thus does not refer to the RPS IE 320. The RPS IE 320 is for an STA listening to the beacon in another group, which prevents the STA in the other group from accessing the RAW allocated the TWT, thereby reducing competition with other STAs at the TWT.

A page ID and a block offset of the RPS IE 320 indicate an AID of a first STA in a group allowed to use the RAW, and a block range indicates a range of STAs included in the group subsequent to the first STA.

A predetermined STA listening to the beacon including the RPS IE 320 may recognize whether access is possible in the RAW. However, in an RAW generated by collecting TWTs allocated to non-TIM STAs, each non-TIM STA recognizes time allocated to the non-TIM STA through separate TWT setup with the AP and does not listen to the beacon. Thus, the beacon including the RPS IE 320 is for preventing channel access by a TIM STA receiving the beacon.

An additional bit may be included in the RPS IE 320 and be used as an indication reporting that the RAW is allocated to the non-TIM STA.

When the additional bit is set, a slot definition of the RPS IE 320 may be omitted. Accordingly, bits of the RPS IE 320 may be reduced.

Here, when AIDs of STAs allocated TWTs among successive TWTs are gathered in a group in advance, the RAW group field may distinguish the STAs allocated the TWTs from other STAs.

However, the AP may have burden of dynamically grouping the AIDs of the STAs allocated the TWTs since grouping is not easy.

Further, when one STA has a plurality of flows with different traffic properties, the STA may set a separate TWT by each flow with the AP, with each TWT having a different period. Different TWTs of each STA may be distinguished through a flow identifier in setting the TWTs.

However, since an AID of an STA may need to be continually changed when AID grouping is necessary for setting an RAW but the STA is generally in a sleep state out of a predetermined time interval from a TWT, AID reallocation information may not be reported. Further, even through reallocation information may be reported, it is needed to continually report the AID changing at each TWT to the STA.

To solve such a problem, a plurality of AIDs may be allocated to an STA. Alternatively, a method of protecting an RAW through 1-bit indication, excluding the RAW group field to protect an allocated TWT, with use of one AID may be used.

Alternatively, in an NDP paging STA, when one flow has a shorter period than a beacon interval and checking traffic in each period is needed, a TWT of the flow with the shorter period than the beacon interval is set only, thereby operating as a TWT STA.

When TWTs of flows with a shorter period than the beacon interval are collected, STAs allocated the TWTs may include both TIM STAs and non-TIM STAs. These two groups are generally allocated different pages in the AID field and thus may not be indicated as one RAW group.

In this case, RAWs are set for the two divided groups or an AID of one group is reallocated. A plurality of AIDs may be allocated. However, since there is no problem with an operation between the AP and the STA even with one fixed AID, indicating an RAW with the RAW group field and reporting that the RAW is allocated to TWT STAs or non-TIM STAs using an additional bit are adequate, instead of changing or adding an AID.

When the same procedure as the TIM STA is notified of the STAs that the RAW is allowed for is conducted for the non-TIM STAs to increase unity, setting a plurality of AIDs for AID grouping is allowed or AID reallocation is enabled. In this case, STAs allocated the RAW may be reported through the RAW group field, regardless of TIM STAs and non-TIM STAs.

Figure 4:
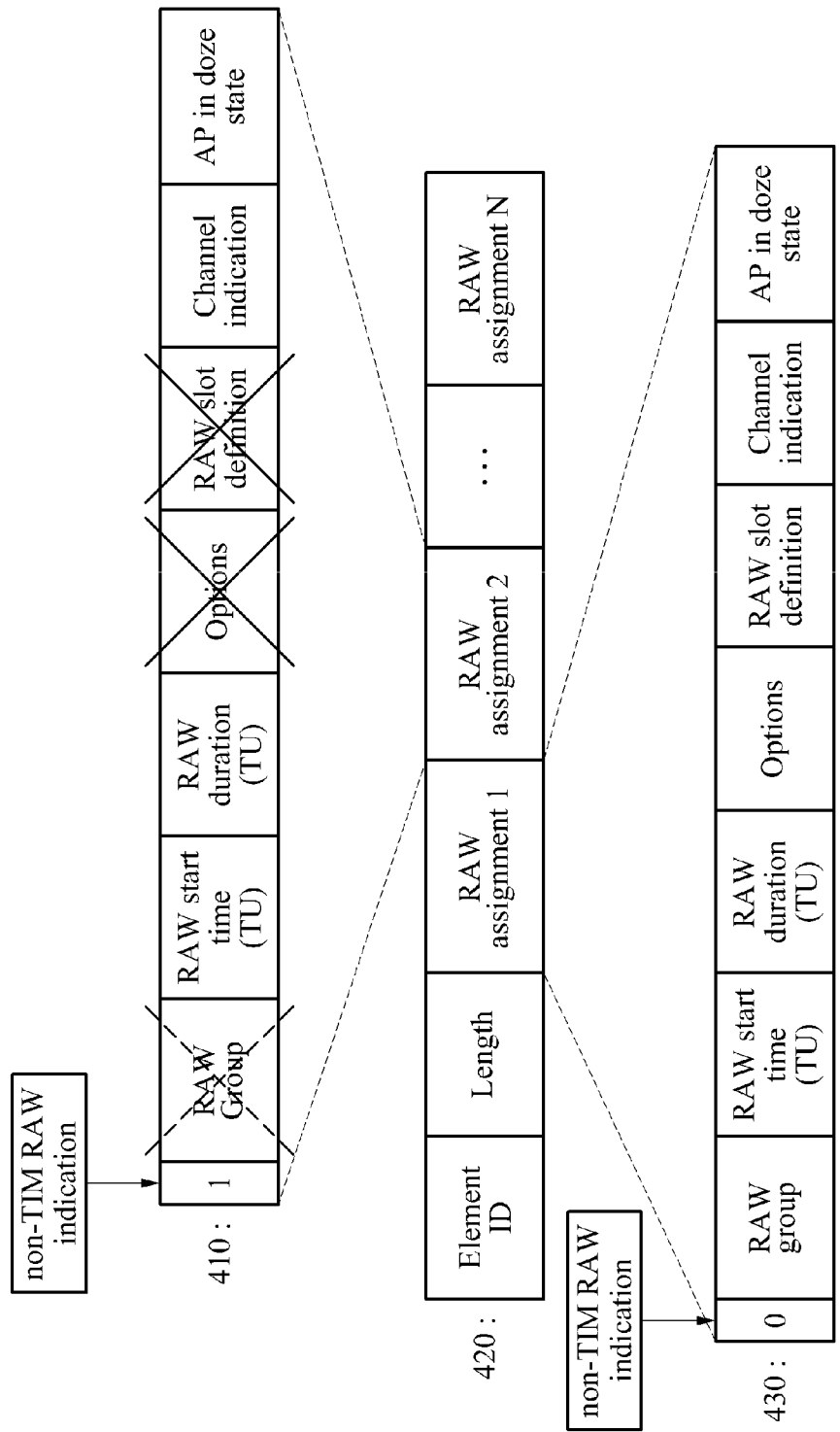
FIG. 4 illustrates a field used by the slot-based channel access control apparatus of the WLAN system to indicate resources allocated to a non-traffic indication map (TIM) station (STA) according to an exemplary embodiment of the present invention.

FIG. 4 illustrates a field used by the slot-based channel access control apparatus of the WLAN system to indicate resources allocated to a non-TIM STA according to an exemplary embodiment of the present invention.

An RPS IE 410 included in an RAW frame 420 of FIG. 4 uses an indication bit, for example, a non-TIM RAW indication, to protect resources for a TWT STA or non-TIM STA.

When the non-TIM RAW indication is set to "1", unnecessary information may be deleted from an RAW. For example, an RAW slot definition field and an option field may be deleted. Further, an RAW group field may be also deleted. A deletable field may change based on meaning of an additional bit. When the bit is set to "0", which means a general RAW, other fields may be still used.

When the additional bit is set to "0", the STA listening to a beacon operates in the same manner as a conventional method. However, when the bit is set to "1", a new operation is defined, which may vary depending on a category of the STA.

In a first scenario, when the additional bit is set to "1", the RAW group field is deleted. STAs other than a TWT STA or non-TIM STA do not access a channel set in a CH indication from RAW start time to RAW duration when the additional bit is set to "1". The TWT STA checks the RPS IE 410, and operates in a TWT allocated to the TWT STA when the allocated TWT is within a range from the RAW start time to the RAW duration.

In a second scenario, when the bit is set to "1", the RAW group field is not deleted. In this instance, when each STA does not belong to an RAW group as defined in an RAW, the STA does not conduct channel access in a time interval indicated in the RAW.

An extended method of using an additional bit for an unscheduled active polling STA will be described. Since an STA may operate by reporting to the AP that the STA is a non-TIM STA in an association operation and by a permission for non-TIM support from the AP, the AP manages non-TIM STAs separately by AID grouping.

The AP schedules an RAW for the unscheduled active polling STA in advance, and notifies the STA of RAW time to conduct data transmission when the unscheduled active polling terminal wakes up and succeeds in channel access, for example, in receiving a PS-poll frame. Accordingly, collisions caused by access in an interval scheduled for another STA as channel access time is unpredictable may be reduced.

Further, the RAW for the unscheduled active polling STA enables STAs having the same service type or STAs operating with similar access categories to be gathered and compete with each other, thereby conducting fair channel access.

To protect resources for the unscheduled active polling STA with the RAW, a protection method for TWT STAs may be extended. Unscheduled active polling STAs are AID-grouped and thus may be expressed accurately with the RAW group field. Alternatively, access of a TIM STA listening to the beacon may be restricted through the additional bit. However, since access of a TWT STA listening to the RPS IE is possible through the additional bit, allocation of an additional bit may be needed for the unscheduled active polling STA to distinguish channel access of the unscheduled active polling STA from that of the TWT STA.

In particular, the additional bit to direct permission for access of the unscheduled active polling STA may be set in the RPS IE. The AP may allow channel access of the unscheduled active polling terminal through the bit, and other fields are not deleted or changed even though the bit is set to "1".

The AP sets the bit to "0" so as not to allow the unscheduled active polling STA to access a resource for the TWT STA. Further, to allocate a resource only to the unscheduled active polling STA, the AP sets the bit to "1" and specifies an AID range of the unscheduled active polling STA allowed to access in the RAW group field.

When the resource is allocated to another type of STAs, not for the unscheduled active polling STA, even with the bit set to "1", it is reported that the unscheduled active polling STA is allowed to access the resource for the other type of STAs.

Figure 5:
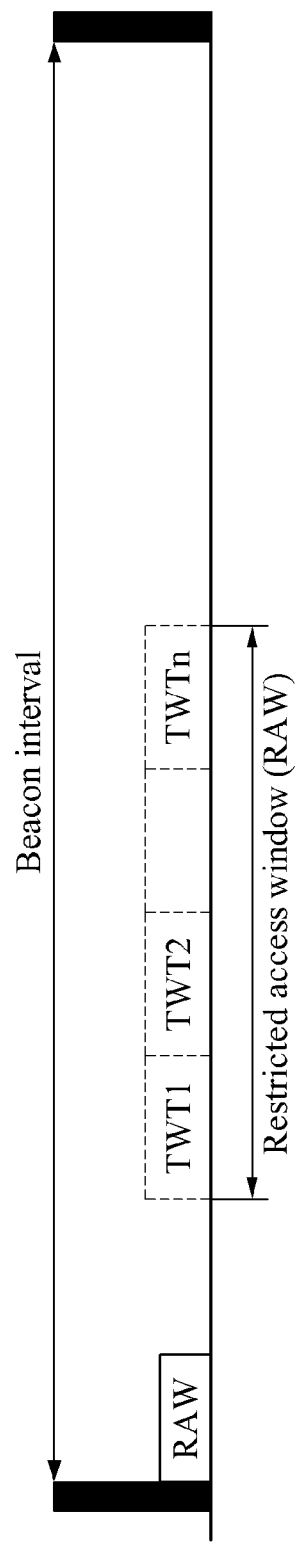
FIG. 5 illustrates an RAW including a target wake time (TWT) set for an STA in the slot-based channel access control apparatus of the WLAN system according to an exemplary embodiment of the present invention.

FIG. 5 illustrates an RAW including a TWT set for an STA in the slot-based channel access control apparatus of the WLAN system according to an exemplary embodiment of the present invention.

Referring to FIG. 5, the RAW is set to include a TWT interval, so that only an STA with a TWT set is allowed to conduct channel access during an RAW interval.

An STA with a set TWT not included in the RAW interval or other types of STAs are not allowed to access the RAW.

Figure 6:
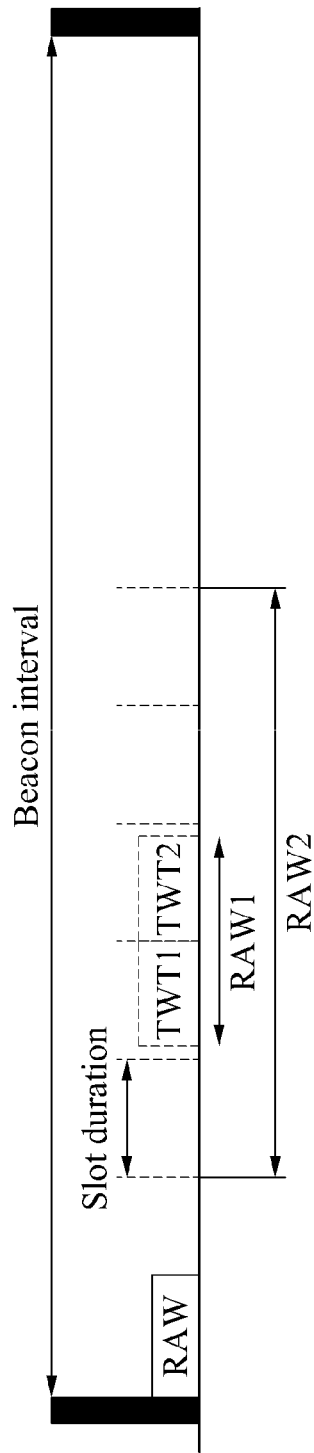
FIG. 6 illustrates that an overlapping period occurs in a plurality of RAWs in the slot-based channel access control apparatus of the WLAN system according to an exemplary embodiment of the present invention.

FIG. 6 illustrates that an overlapping period occurs in a plurality of RAWs in the slot-based channel access control apparatus of the WLAN system according to an exemplary embodiment of the present invention.

In FIG. 6, RAW1 for a TWT and RAW2 for another group are not scheduled in different periods and thus overlap each other. In this instance, access of other groups to RAW1 for the TWT is restricted. However, since RAW2 for the group includes RAW1, the group belonging to RAW2 may access RAW1.

When an RAW for a group overlaps an RAW for another group, a rule is set up such that an NAV is set to restrict access of the other group to the RAW for the group, and accordingly an STA in the group belonging to RAW2 does not access RAW1. Alternatively, access priority is set by group corresponding to an RAW, and a group with higher priority may be allowed to access an RAW when two RAWs overlap each other.

For example, when a non-TIM STA group with respect to RAW1 including a set TWT has higher priority than other groups, a group belonging to RAW2 is restricted to access RAW1. Further, an STA allocable the TWT in RAW1 does not listen to a beacon and thus is not restricted to access RAW2.

Figure 7:
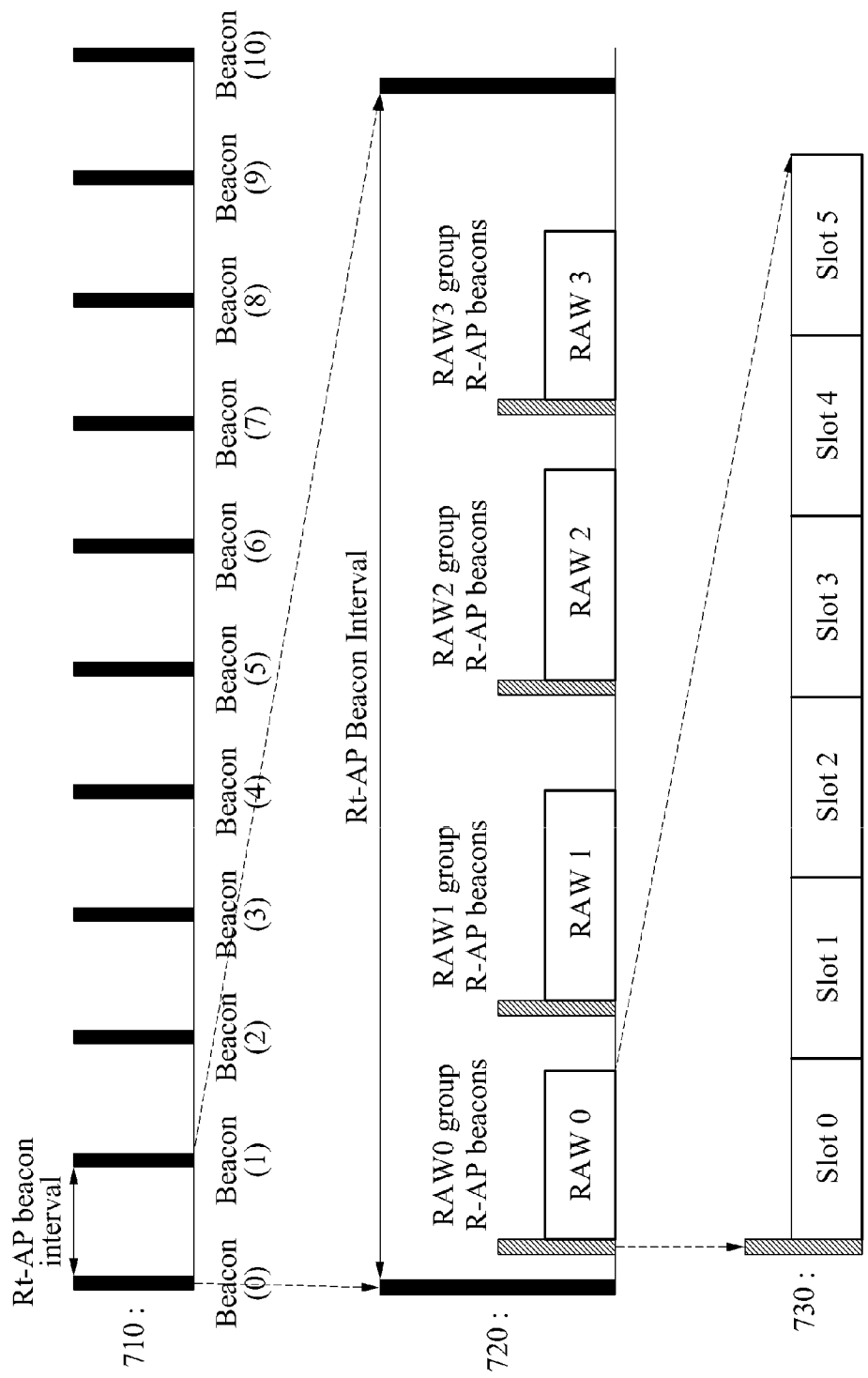
FIG. 7 illustrates allocation of resources to terminals associated with a relay STA in the slot-based channel access control apparatus of the WLAN system according to an exemplary embodiment of the present invention.

FIG. 7 illustrates allocation of a resource to terminals associated with a relay STA in the slot-based channel access control apparatus of the WLAN system according to an exemplary embodiment of the present invention.

A PRAW may be used not only for protection of a resource allocated to a non-TIM STA but when a resource allocated to a TIM STA in an AID range is periodic. In addition, the PRAW may be also used to configure a hierarchical network in which a root AP (Rt-AP) is present and a relay belonging to a network is used as an AP (R-AP) for another network.

In a beacon interval 710 of an Rt-AP, an R-AP may allocate an RAW to each RAW group 720. The RAW may include slots 730. A corresponding group or STA may conduct channel access in a slot based on an AID included in the RAW.

The Rt-AP may allocate the R-AP resources needed for data exchange with STAs associated with the Rt-AP. When a plurality of R-AP is present, the resources may be allocated periodically, not in the beacon interval. In this case, the PRAW may be used.

In particular, the R-AP may notify each R-AP of resources available for a network of the R-AP in the RAW through a long beacon, particularly the PRAW to reduce overhead.

A bit indicating allocation of the PRAW to a single STA may be defined. When the bit is set, page ID, only an AID may be included in an RPS IE, excluding block offset and block range fields. A partial AID may be used to identify the R-AP.

Time at which the PRAW appears first may be calculated by the same method as used for allocation of the PRAW for the non-TIM STA.

In FIG. 7, RAW start time of the PRAW is start time of each R-AP beacon, and an RAW duration value of the RPS IE is set to include an end of the RAW.

When the PRAW does not start immediately after a long beacon, start time of the first PRAW may be determined using relative time or absolute time described above.

A resource may be allocated to the R-AP through time sharing by changing start time of the PRAW. For example, when RAW0 of a beacon "0" of the Rt-AP is allocated to R-AP0 and an RAW falling on the same position from the Rt-AP beacon and occupying the same interval is allocated to one after a beacon "1" of the Rt-AP, for example, RAW4 is allocated to R-AP4, the Rt-AP allocates the PRAW to R-AP0 and R0-AP4. Here, since RAWs allocated from the long beacon start at different times even with the same period, the two R-APs may temporally share resources evenly for use. When different numbers of STAs are associated with the respective R-APs or traffic is different for the R-APs, different resources may be allocated by adjusting the RAW duration of the RPS IE.

Figure 8:
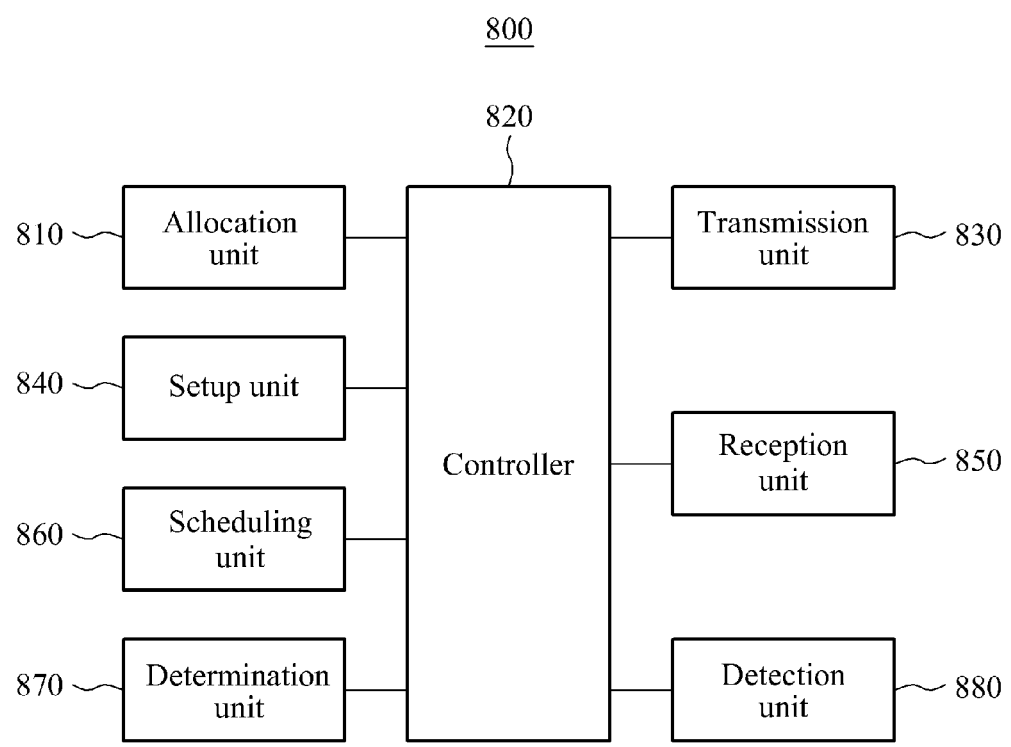
FIG. 8 is a block diagram illustrating a slot-based channel access control apparatus in the WLAN system according to an exemplary embodiment of the present invention.

FIG. 8 is a block diagram illustrating a slot-based channel access control apparatus in the WLAN system according to an exemplary embodiment of the present invention.

Referring to FIG. 8, the slot-based channel access control apparatus 800 of the WLAN system according to the present embodiment may include an allocation unit 810, a controller 820, a transmission unit 830, a setup unit 840, a reception unit 850, a scheduling unit 860, a determination unit 870 and a detection unit 880.

The allocation unit 810 may allocate a slot defined in a beacon interval to each STA or a group of STAs determined by the controller 820 so as to distinguish channel access times.

The controller 820 may determine one of each STA and the group of STAs as a slot allocation target.

The transmission unit 830 may transmit a beacon including information on an allocated slot.

The information on the allocated slot may include allocation control information, an AID, a start slot ID and allocation duration information.

The information on the allocated slot may include only an AID and a start slot ID when slots are allocated to respective STAs and resources are successively allocated to the respective STAs.

The information on the allocated slot may include only a start slot ID according to order of being set to "1" bit in a TIM when resources are allocated only to STAs set to "1" bit in the TIM.

The STAs may include a TIM STA that checks the received beacon and verifies buffered DL data or a non-TIM STA that does not verify the beacon or buffered DL data of a TIM broadcast frame.

The TIM STA may be a scheduled beacon checking STA that listens to the beacon and conducts channel access in the allocated slot.

The non-TIM STA may be one of a scheduled active polling STA, which is allocated a slot in response to a request of the STA and conducts channel access in the allocated slot, an unscheduled active polling STA conducting channel access without resource allocation, and a terminal for saving power by setting up NDP paging.

The setup unit 840 sets up a period including an entire TWT period to be allocated as RAW when the beacon interval includes a TWT to be allocated by the allocation unit 810, and the transmission unit 830 may transmit RAW related information to be included in the beacon.

The RAW related information may be defined as an RAW parameter set information element (RPS IE), which may include RAW group information, RAW start time information, RAW duration information and slot information.

The RAW group information may include a page ID, a block offset and a block range.

The TIM STA receiving the beacon including the RAW related information may not conduct channel access in the RAW.

When the RPS IE includes an indicator showing that the RAW is allocated to the non-TIM STA, the RAW group information and slot information may be omitted.

When the RPS IE includes an indicator showing that the RAW is allocated to the non-TIM STA and the RAW group information is omitted, the TIM STA listening to the RPS IE does not access a channel set in a channel (CH) indication field during a time of RAW duration from RAW start time.

When the allocated TWT is included during the time of the RAW duration from the RAW start time, the TWT STA listening to the RPS IE may conduct channel access at the allocated TWT.

When periods of a plurality of RAWs overlap with each other, the setup unit 840 may set up a network allocation vector (NAV) or access priority by RAW group so that the STAs or group does not conduct channel access in an overlapping time.

The reception unit 850 may receive, from the non-TIM STA, whether to support a TWT function allocated as wakeup time of the non-TIM STA through an association request frame, and the allocation unit 810 may allocate an AID of the TWT STA supporting the TWT function to a non-TIM STA group supporting the TWT function.

When the STAs have a plurality of flows with different traffic properties, the allocation unit 810 may allocate a TWT identified as a flow identifier to each flow and allocate a plurality of AIDs to the respective STAs.

The scheduling unit 860 may schedule a RAW for the unscheduled active polling STA in advance.

When the reception unit 850 receives a PS-poll frame from the unscheduled active polling STA, the transmission unit 830 may transmit RAW related information scheduled in advance to the unscheduled active polling STA.

The RAW related information may be defined as an RPS IE, which may include RAW group information, RAW start time information, RAW duration information, an indicator showing that the RAW is allocated to the non-TIM STA and an indicator showing that the RAW is allocated to the unscheduled active polling STA.

The allocation unit 810 may periodically allocate resources for the non-TIM STA set to be an RAW, as a periodic RAW (PRAW), to the STAs or group determined by the controller 820, and the transmission unit 830 may transmit a beacon including information on the allocated PRAW.

The information on the PRAW may be defined as an RPS IE, which may include an indicator showing that the allocated RAW is the PRAW, a PRAW period and PRAW start time information.

The PRAW start time information may include relative PRAW start time calculated using an offset that is a number of beacon intervals in which a first PRAW appears from a long beacon.

The PRAW start time information may include absolute PRAW start time calculated using a timing synchronization function (TSF).

The transmission unit 830 may transmit the RPS IE to be included in the long beacon.

The allocation unit 810 may allocate a slot to STAs or a group associated with a relay STA from the relay STA using the PRAW, and the transmission unit 830 may transmit a beacon including information on an allocated PRAW.

The information on the allocated PRAW may include an indicator showing that the PRAW is allocated to a single STA and an AID of the single STA.

The allocation unit 810 may allocate different start times of first PRAWs allocated to a plurality of relay STAs, so that resources may be allocated to different relay STAs through time sharing.

The detection unit 880 may detect a channel for data sensing time set in the allocated slot, and the determination unit 870 may determine that the allocated slot is in an idle state when the channel is not detected for the data sensing time.

The transmission unit 830 may transmit information indicating that the allocated slot is in the idle state to an STA not allocated a slot.

The transmission unit 830 may transmit the information indicating that the allocated slot is in the idle state, which is being included in a clear to send to self (CTS-to-self) frame in an NDP form, to the STA not allocated the slot.

Figure 9:
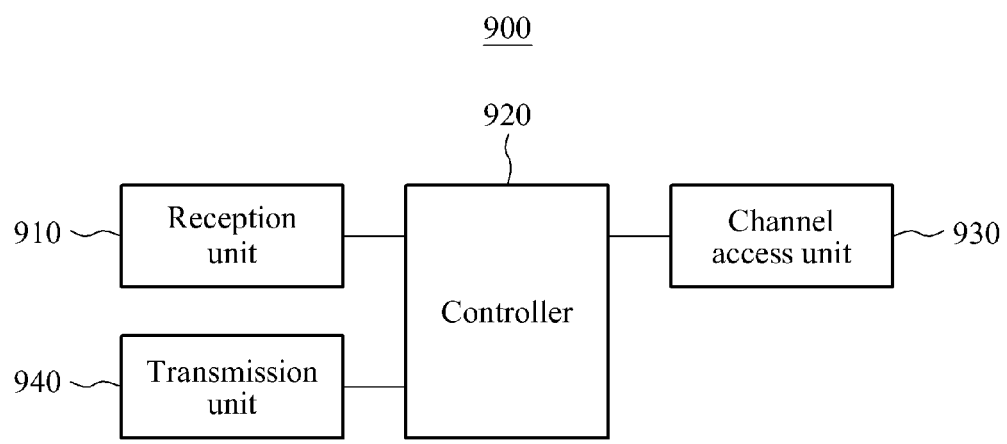
FIG. 9 is a block diagram illustrating a slot-based channel access terminal in the WLAN system according to an exemplary embodiment of the present invention.

FIG. 9 is a block diagram illustrating a slot-based channel access terminal in the WLAN system according to an exemplary embodiment of the present invention.

Referring to FIG. 9, the slot-based channel access terminal 900 of the WLAN system according to the present embodiment may include a reception unit 910, a controller 920, a channel access unit 930 and a transmission unit 940.

The reception unit 910 may receive a beacon including information on an allocated slot from an AP.

The controller 920 may set an NAV of transmission opportunity (TxOP) in the slot based on data capacity.

The channel access unit 930 may conduct channel access in the slot based on the information on the allocated slot.

The reception unit 910 may receive information on an RAW including successively allocated slots from the AP.

The channel access unit 930 may conduct channel access in a corresponding slot based on RAW group information, RAW start time information, RAW duration information and slot information included in the information on the RAW.

When the information on the RAW includes an RPS IE indicating that the RAW allocated to a non-TIM STA, STAs other than the non-TIM STA may not conduct channel access in the allocated RAW.

When the slot-based channel access terminal 900 of the WLAN system is a non-TIM STA, the transmission unit 940 may transmit a PS-poll frame.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A channel access control method in a wireless local area network (WLAN) system, the method comprising:
   generating an allocation frame comprising slot allocation information on a slot allocated to at least one station (STA); and
   transmitting the generated allocation frame,
   wherein the slot allocation information comprises an indicator that indicates whether the slot allocation information comprises information on an association identification (AID) of a STA allocated to the slot or a group ID of STAs allocated to the slot,
   wherein, when the indicator indicates a first value, the slot allocation information includes the AID without the group ID, and
   wherein, when the indicator indicates a second value, the slot allocation information includes the group ID without the AID.

2. The method of claim 1, wherein the slot allocation information further comprises a slot start offset with regard to a start of the slot.

3. A channel access control method in a wireless local area network (WLAN) system, the method comprising:
   allocating a restricted access window (RAW) for a non-traffic indication map (non-TIM) station (STA), the non-TIM STA accessing a channel without listening to a beacon from an access point (AP), a TIM STA accessing the channel based on a TIM included in the beacon from the AP; and
   transmitting a beacon comprising RAW related information on the allocated RAW,
   wherein the RAW related information comprises an indicator indicating whether the RAW is allocated for the non-TIM STA,
   wherein the RAW related information comprises a RAW assignment field, and
   wherein, when the indicator indicates the RAW is allocated to the non-TIM STA, a RAW group field is not present in the RAW assignment field.

4. The method of claim 3, wherein the allocating comprises setting up a RAW for a target wake time (TWT) period of a STA supporting a TWT function.

5. The method of claim 3, wherein an access of the TIM STA to the channel is not allowed within the allocated RAW.

6. The method of claim 3, wherein the allocating comprises allocating a periodic RAW (PRAW) for the non-TIM STA.

7. The method of claim 6, wherein the RAW related information comprises an indicator to indicate whether the RAW is the PRAW.

8. The method of claim 6, wherein RAW related information comprises information on time at which the RAW starts or at which the PRAW starts.

9. The method of claim 6, wherein RAW related information comprises information on a duration of the RAW or the PRAW.

10. The method of claim 6, wherein RAW related information comprises information on a period in which the RAW is repeated.

11. The method of claim 3,
    wherein, when the indicator indicates the RAW is allocated to the non-TIM STA, the RAW assignment field conditionally comprises a RAW start time field and a channel indication field.

12. The method of claim 3, wherein the non-TIM STA accesses the channel by transmitting data to the AP over the channel when the non-TIM STA wakes up.

13. A channel access method in a wireless local area network (WLAN) system, the method comprising:
    receiving, by a station (STA), a beacon comprising RAW related information on an allocated restricted access window (RAW) from an access point (AP); and
    determining, by the STA, whether to access to the AP based on the RAW related information,
    wherein the AP allocates the RAW for a non-traffic indication map (non-TIM) STA and transmits the beacon comprising the RAW related information on the allocated RAW, the non-TIM STA accessing a channel without listening to a beacon from the AP, a TIM STA accessing the channel based on a TIM included in the beacon from the AP,
    wherein the RAW related information comprises an indicator to indicate whether the RAW is allocated for the non-TIM STA,
    wherein the RAW related information comprises a RAW assignment field, and
    wherein, when the indicator indicates the RAW is allocated to the non-TIM STA, a RAW group field is not present in the RAW assignment field.

14. The method of claim 13, wherein the non-TIM STA accesses the channel by transmitting data to the AP over the channel when the non-TIM STA wakes up.

* * * * *